United States Patent
Nakamura et al.

(10) Patent No.: US 9,543,583 B2
(45) Date of Patent: Jan. 10, 2017

(54) COMPOSITE ELECTRODE MATERIAL

(71) Applicant: SHOWA DENKO K.K., Minato-ku, Tokyo (JP)

(72) Inventors: Takeshi Nakamura, Tokyo (JP); Nobuaki Ishii, Tokyo (JP); Masataka Takeuchi, Tokyo (JP)

(73) Assignee: SHOWA DENKO K.K., Tokyo (JP)

(*) Notice: Subject to any disclaimer, the term of this patent is extended or adjusted under 35 U.S.C. 154(b) by 193 days.

(21) Appl. No.: 14/166,359

(22) Filed: Jan. 28, 2014

(65) Prior Publication Data

US 2014/0212762 A1    Jul. 31, 2014

(30) Foreign Application Priority Data

Jan. 29, 2013    (JP) .................. 2013-014884

(51) Int. Cl.
*H01M 4/587* (2010.01)
*H01M 4/36* (2006.01)
*H01M 4/38* (2006.01)
*H01M 4/42* (2006.01)
*H01M 4/44* (2006.01)
*H01M 10/0525* (2010.01)

(52) U.S. Cl.
CPC ........... *H01M 4/587* (2013.01); *H01M 4/364* (2013.01); *H01M 4/386* (2013.01); *H01M 4/387* (2013.01); *H01M 4/42* (2013.01); *H01M 4/44* (2013.01); *H01M 10/0525* (2013.01); *Y02E 60/122* (2013.01)

(58) Field of Classification Search
CPC ...... H01M 4/364; H01M 4/386; H01M 4/387; H01M 4/46; H01M 4/587; H01M 10/0525; Y02E 60/122
See application file for complete search history.

(56) References Cited

U.S. PATENT DOCUMENTS

| | | | |
|---|---|---|---|
| 2010/0136431 A1 | 6/2010 | Lee et al. | |
| 2011/0163274 A1* | 7/2011 | Plee | H01M 4/134 252/503 |
| 2011/0165465 A1 | 7/2011 | Kim et al. | |
| 2013/0071741 A1* | 3/2013 | Ohara | H01M 4/62 429/212 |

FOREIGN PATENT DOCUMENTS

| | | |
|---|---|---|
| JP | 2012-501515 A | 1/2012 |
| WO | 2012/086976 A2 | 6/2012 |

OTHER PUBLICATIONS

Search Report issued in corresponding European Patent Application No. 13183852 on May 13, 2014.

* cited by examiner

*Primary Examiner* — Brittany Raymond
(74) *Attorney, Agent, or Firm* — Sughrue Mion, PLLC (57) ABSTRACT

Particles (A) including an element capable of intercalating and deintercalating lithium ions, carbon particles (B) capable of intercalating and deintercalating lithium ions, multi-walled carbon nanotubes (C), carbon nanofibers (D) and optionally electrically conductive carbon particles (E) are mixed in the presence of shear force to obtain a composite electrode material. A lithium ion secondary battery is obtained using the above composite electrode material.

11 Claims, 7 Drawing Sheets

COMPOSITE ELECTRODE MATERIAL

This application claims priority under 35 U.S.C. sect. 119(a) on Patent Application No. 2013-014884 filed in Japan on Jan. 29, 2013, the entire contents of which are hereby incorporated by references.

TECHNICAL FIELD

The present invention relates to a composite electrode material. More specifically, the present invention relates to a composite electrode material having high energy density which can achieve both high initial capacity and high capacity maintenance ratio.

BACKGROUND ART

Carbon materials can impart electric conductivity, thermal conductivity and the like on resin materials, coating materials and the like. Moreover, carbon materials are also used as an electrode material for a battery. For these carbon materials, carbon nanofibers, carbon nanotubes, carbon black and the like are known.

CITATION LIST

Patent Literature

Patent Literature 1: JP 2012-501515 W

SUMMARY OF INVENTION

Technical Problem

Carbon nanofibers have a relatively thick fiber diameter of 50 nm to 300 nm, and a fiber length of about 10 µm. Such carbon nanofibers show weak entanglement between the fibers, and thus each of the carbon nanofibers can be easily dispersed by adding to a matrix and kneading. However, when trying to sufficiently construct electrically conductive networks by connecting the carbon nanofibers to each other, a large amount of carbon nanofibers needs to be added.

On the other hand, carbon nanotubes have a thin fiber diameter of 5 nm to 30 nm and a fiber length of 3 µm to 10 µm, showing an aspect ratio of near 1000. Carbon nanotubes are easily entangled with each other to form aggregates (linkles). Even when added to a matrix, aggregates are not untangled, and electrically conductive networks are hardly assembled.

Further, carbon black represents particles having a primary particle diameter of several nanometers to several tens of nanometers. Carbon black forms a secondary structure called "STRUCTURE" in which primary particles are lined up. This "STRUCTURE" usually has a line-up length of as short as about 100 nm. Further, STRUCTRES can be relatively easily untangled because they are not firmly aggregated to each other. Since the contacts between particles of carbon black and between particles of carbon black and other particles are point contacts, expansion and contraction may decrease the degree of point contacts, easily resulting in loss of electric conductivity.

Meanwhile, in order to achieve a high capacity for a lithium ion battery, use of particles containing a metal element such as Si, Sn or the like has been proposed for a negative electrode material. For example, the theoretical capacity of a lithium ion battery in which Si-containing particles are used for a negative electrode material is 4200 mAh/g. Given that the theoretical capacity of a lithium battery in which metallic lithium is used is 3900 mAh/g, if Si and the like can be used for a negative electrode material, a smaller lithium ion battery with a higher capacity as compared with a lithium battery may be obtained as would be expected. However, since particles comprising a metal element such as Si have very low electric conductivity and large resistance for intercalation and deintercalate of lithium ions, a less-than-expected capacity may result. Moreover, since the particles finely break up by repeated large expansion and contraction associated with intercalation and deintercalate of lithium ions, electric contacts are broken to increase internal resistance. As a result, only a lithium ion battery with a short charge-and-discharge cycle life is obtained. In order to ease the stress associated with large expansion and contraction associated with intercalation and deintercalate of lithium ions, use of Si particles microparticulated in a nano order has been proposed. However, the increased number of Si particles per unit weight requires a large additive amount of an electrically conductive auxiliary agent such as carbon black in order to build electrically conductive networks. This results in not only decreased energy density as an electrode, but also a poor effect to control expansion and contraction as a whole electrode structure.

A negative electrode material comprising particles containing a metal element such as Si and fibrous carbon has been proposed. For example, Patent Literature 1 proposes a composite electrode material comprising an electrochemically active component such as Si particles, an electrically conductive additive and a binder, wherein the electrically conductive additive is a mixture comprising carbon nanofibers (CNF) and carbon nanotubes (CNT). This composite electrode material is manufactured by crushing and dispersing CNT in an aqueous solution of carboxymethylcellulose (CMC) using a ball mill, and then adding particles containing a metal element and CNF to the resulting CNT dispersion liquid followed by further crushing with a ball mill. The composite electrode material obtained by this method appears to require 12 parts by weight or more of an electrically conductive auxiliary agent relative to 100 parts by weight of the active component. This seems to be caused by very low electric conductivity of the active component in the electrode such as Si particles, i.e., the component capable of intercalating and deintercalating lithium ions.

An object of the present invention is to provide a composite electrode material having high energy density which can achieve both a high initial capacity and a high capacity maintenance ratio.

Solution to Problem

The present inventors conducted extensive studies to achieve the above object. As a result, the present invention including the following aspects has been completed.

That is, the present invention includes the following aspects.

[1] A composite electrode material, comprising:
particles (A) comprising an element capable of intercalating and deintercalating lithium ions,
carbon particles (B) capable of intercalating and deintercalating lithium ions,
multi-walled carbon nanotubes (C), and
carbon nanofibers (D)
wherein
the carbon nanofibers (D) are cross-linked with two or more of the carbon particles (B), the multi-walled carbon nanotubes (C) are cross-linked with two or more of the particles (A), and the multi-walled carbon nanotubes (C) are present between the carbon particles (B) and the carbon nanofibers (D).

[2] The composite electrode material according to [1], wherein the multi-walled carbon nanotubes (C) essentially have a fiber diameter of not less than 5 nm and not more than 30 nm, and the carbon nanofibers (D) essentially have a fiber diameter of not less than 50 nm and not more than 300 nm.

[3] The composite electrode material according to [1] or [2], further comprising electrically conductive carbon particles (E).

[4] The composite electrode material according to any one of [1] to [3], wherein the mean fiber length of the carbon nanofibers (D) is 0.4 or more relative to the 50% particle diameter of the carbon particles (B).

[5] The composite electrode material according to any one of [1] to [4], wherein the aspect ratio of the multi-walled carbon nanotubes (C) in the composite electrode material is 100 or more.

[6] The composite electrode material according to any one of [1] to [5], wherein the amount of the particles (A) is not less than 1 part by mass and not more than 100 parts by mass relative to 100 parts by mass of the carbon particles (B).

[7] The composite electrode material according to any one of [1] to [6], wherein the element capable of intercalating and deintercalating lithium ions is at least one selected from the group consisting of Si, Sn, Ge, Al and In.

[8] The composite electrode material according to any one of [1] to [7], wherein the amount of the multi-walled carbon nanotubes (C) is not less than 0.1 part by mass and not more than 10 parts by mass relative to total 100 parts by mass of the particles (A) and the carbon particles (B), and the amount of the carbon nanofibers (D) is not less than 0.1 part by mass and not more than 20 parts by mass relative to total 100 parts by mass of the particles (A) and the carbon particles (B).

[9] The composite electrode material according to any one of [1] to [8], wherein the particles (A) have a number average primary particle diameter of not less than 5 nm and not more than 1000 nm.

[10] A lithium ion secondary battery comprising the composite electrode material according to any one of [1] to [9].

Advantageous Effects of Invention

The composite electrode material according to one embodiment in the present invention has an excellent effect to significantly reduce electrode resistance and to control expansion and contraction. When the composite electrode material according to one embodiment in the present invention is used as an electrode of a lithium ion battery, its battery characteristics such as energy density, an initial capacity and a capacity maintenance ratio can be improved.

DESCRIPTION OF EMBODIMENTS

The composite electrode material according to one embodiment in the present invention comprises the particles (A), the carbon particles (B), the multi-walled carbon nanotubes (C) and the carbon nanofibers (D). The composite electrode material according to another embodiment in the present invention comprises the particles (A), the carbon particles (B), the multi-walled carbon nanotubes (C), the carbon nanofibers (D) and the electrically conductive carbon particles (E).

(Particles (A) Comprising an Element Capable of Intercalating and Deintercalating Lithium Ions)

The particles (A) used for the composite electrode material according to one embodiment in the present invention comprise a substance comprising an element capable of intercalating and deintercalating lithium ions. As a matter of course, the particles (A) refer to particles other than the carbon particles (B) described below. There is no particular limitation for the element included in the particles (A) as long as it is capable of intercalating and deintercalating lithium ions. Preferred elements include Si, Sn, Ge, Al or In. Among these, Si is preferred in view of heat resistance. The particles (A) may comprise a simple substance or a compound, a mixture, an eutectic mixture or a solid solution comprising at least one of the these elements. Further, the particles (A) may be aggregates of two or more fine particles, that is, may be secondary particles. Shapes of the particles (A) include a massive form, a scale-like form, a globular form, a fibrous form and the like. Among these, a globular form or a massive form is preferred.

Mentioned as Si element-containing substances are substances represented by the general formula: $M^a_m Si$. The substances are compounds, mixtures, eutectic mixtures or solid solutions comprising an element $M^a$ in a ratio of m mol relative to 1 mol of Si.

$M^a$ is an element except for Li. Specifically, examples of $M^a$ include Si, B, C, N, O, S, P, Na, Mg, Al, K, Ca, Ti, V, Cr, Mn, Fe, Co, Ni, Cu, Zn, Mo, Ru, Rh, Pd, Pt, Be, Nb, Nd, Ce, W, Ta, Ag, Au, Cd, Ga, In, Sb, Ba and the like. Note that in the case where $M^a$ is Si, Si simple substance is meant. In the formula, m is preferably 0.01 or more, more preferably 0.1 or more, even more preferably 0.3 or more.

Examples of the Si-containing substances include Si simple substance; alloy of Si and alkaline earth metal; alloy of Si and transition metal; alloy of Si and semimetal; solid soluted alloys or eutectic alloys of Si and Be, Ag, Al, Au, Cd, Ga, In, Sb or Zn; silicides such as CaSi, $CaSi_2$, $Mg_2Si$, BaSi$_2$, Cu$_5$Si, FeSi, FeSi$_2$, CoSi$_2$, Ni$_2$Si, NiSi$_2$, MnSi, MnSi$_2$, MoSi$_2$, CrSi$_2$, Cr$_3$Si, TiSi$_2$, Ti$_5$Si$_3$, NbSi$_2$, NdSi$_2$, CeSi$_2$, WSi$_2$, W$_5$Si$_3$, TaSi$_2$, Ta$_5$Si$_3$, PtSi, V$_3$Si, VSi$_2$, PdSi, RuSi and RhSi; SiO$_2$; SiC; Si$_3$N$_4$; and the like.

Sn-containing Substances include tin simple substance, tin alloys, tin oxides, tin sulfides, tin halides, stannide and the like. Specific examples of the Sn-containing substances include alloy of Sn and Zn, alloy of Sn and Cd, alloy of Sn and In, alloy of Sn and Pb; tin oxides such as SnO, SnO$_2$ and M$^b{}_4$SnO$_4$ (M$^b$ represents a metal element other than Sn), tin sulfides such as SnS, SnS$_2$ and M$^b{}_2$SnS$_3$ (M$^b$ represents a metal element other than Sn); tin halides such as SnX$_2$, SnX$_4$, M$^b$SnX$_4$ (M$^b$ represents a metal element other than Sn. X represents a halogen atom); stannide such as MgSn, Mg$_2$Sn, FeSn, FeSn$_2$, MoSn and MoSn$_2$.

The particles (A) preferably have an oxidized surface layers. The surface layers may be oxidized by natural oxidation or artificial oxidation. The particles (A) will be covered with a thin oxide coating by this oxidation.

The particles (A) have a number average primary particle diameter of preferably not less than 5 nm and not more than 1000 nm, more preferably not less than 10 nm and not more than 1000 nm, even more preferably not less than 30 nm and not more than 500 nm. The particles (A) in a state of a raw material usually may form aggregates (secondary particles), and may have a peak both in the range between. 0.1 μm and 1 μm and in the range between 10 μm and 100 μm in the particle size distribution of the aggregates (secondary particles). Further, the 50% particle diameter (D$_{50}$) of the particles (A) in a state of a raw material is preferably 1/200 to 1/10, more preferably 1/100 to 1/20 relative to the 50% particle diameter of the carbon particles (B) in a state of a raw material. Note that the 50% particle diameter is a value computed from the volume based accumulative particle size distribution obtained by measuring without distinguishing primary particles and secondary particles.

In the present invention, the particles (A) preferably adhere on the surfaces of the carbon particles (B). In a case where they adhere on the surfaces of the carbon particles (B), aggregates of the particles (A) are untangled to increase the number of those in the state of primary particles. The aggregates of the particles (A) in the composite electrode material have a number average particle diameter of preferably 0.01 to 10 μm, more preferably 0.01 to 5 μm, even more preferably 0.05 to 1 μm. In the conventional technologies, even the particles (A) in a state where they adhere to the carbon particles (B) are easily aggregated, and often have a number average particle diameter of larger than 10 μm due to secondary particles (aggregates) having large diameters. Note that the distribution of the particles (A) in a state where they adhere to the carbon particles (B) can be determined based on a SEM observation image.

The amount of the particles (A) is preferably not less than 1 part by mass and not more than 100 parts by mass, more preferably not less than 3 parts by mass and not more than 50 parts by mass, even more preferably not less than 5 parts by mass and not more than 30 parts by mass relative to 100 parts by mass of the carbon particles (B).

(Carbon Particles (B))

The carbon particles (B) used for the composite electrode material according to one embodiment in the present invention are particles comprising a carbon material capable of intercalating and deintercalating lithium ions. As a carbon material, used are graphite materials such as artificial graphite, pyrolytic graphite, expanded graphite, natural graphite, flaky graphite and scale-like graphite; or poorly crystalline carbonaceous materials such as graphitizable carbon, non-graphitizable carbon, glassy carbon, amorphous carbon, low temperature calcined charcoal. Among these, the carbon particles (B) are preferably those comprising a graphite material, those comprising graphite core particles and carbonaceous shell layers, those comprising carbon coated graphite particles to which carbon fibers are attached or those comprising a poorly crystalline carbonaceous material.

The carbon particles (B) have a 50% particle diameter (D$_{50}$) in volume based accumulative particle size distribution of preferably not less than 2 μm and not more than 40 μm, more preferably not less than 2 μm and not more than 30 μm, even more preferably not less than 3 μm and not more than 20 μm. In the case of the carbon particles (B) comprising many fine particles, electrode density often may not be easily increased. In contract, in the case of the carbon particles (B) comprising many large particles, output characteristics often may decline since a solid diffusion distance of lithium ions is long. This suggests that the carbon particles (B) preferably have the particle size distribution in which 90% by number or more of the particles have a particle diameter in the range of 1 to 50 μm, preferably the particle size distribution in which 90% by number or more of the particles have a particle diameter in the range of 5 to 50 μm. Further, the carbon particles (B) have a 10% particle diameter (D$_{10}$) in volume based accumulative particle size distribution of preferably 1 μm or more, more preferably 2 μm or more. Note that particle size distribution of the carbon particles (B) is measured by a laser diffraction particle size distribution measurement system. This particle size distribution is obtained by measurements without distinguishing primary particles and secondary particles. Note that the particle distributions for the carbon particles (B) comprising a graphite material, the carbon particles (B) comprising graphite core particles and carbonaceous shell layers, the carbon particles (B) comprising carbon coated graphite particles to which carbon fibers are attached and the carbon particles (B) comprising a poorly crystalline carbonaceous material described below are also preferred to follow the particle size distribution as described above.

[Carbon Particles (B) Comprising a Graphite Material]

The carbon particles (B) according to one embodiment are graphite particles, preferably artificial graphite particles. The graphite particles have a d$_{002}$ of preferably 0.337 nm or less, more preferably 0.336 nm or less. Further, the graphite particles have an L$_c$ of preferably 50 nm or more, more preferably not less than 50 nm and not more than 100 nm. Note that d$_{002}$ is an interplanar spacing as determined from the 002 diffraction line in the powder X ray diffraction, and L$_c$ is a size in the c axis direction as determined from the 002 diffraction line in the powder X ray diffraction.

Suitable graphite particles have a BET specific surface area of preferably not less than 1 m$^2$/g and not more than 10 m$^2$/g, more preferably not less than 1 m$^2$/g and not more than 7 m$^2$/g. For artificial graphite particles, coal based coke and/or petroleum based coke can be used as a raw material.

For artificial graphite particles, preferred are those prepared by heat-treating coal based coke and/or petroleum based coke at a temperature of preferably 2000° C. or higher, more preferably 2500° C. or higher. There is no particular limitation for the upper limit of the temperature for the heat treatment, but is preferably 3200° C. The heat treatment is preferably performed under an inert atmosphere. In the heat treatment, a conventional Atchison graphitization furnace and the like can be used.

[Carbon Particles (B) Comprising Graphite Core Particles and Carbonaceous Shell Layers]

The carbon particles (B) according to another embodiment comprise graphite core particles and carbonaceous shell layers present on the surfaces of the core particles (hereinafter may be referred to as carbon coated graphite particles).

The graphite core particles are those prepared by heat-treating petroleum based coke and/or coal based coke at a temperature of preferably 2000° C. or higher, more preferably 2500° C. or more. Further, the graphite particles preferably have the properties of the carbon particles (B) comprising a graphite material described above.

The carbonaceous shell layers present on the surfaces of the core particles show the ratio, $I_D/I_G$ (the R value) of the intensity ($I_D$) of the peak from a noncrystalline component in the range between 1300 and 1400 $cm^{-1}$ and the intensity ($I_G$) of the peak from a graphite component in the range between 1580 and 1620 $cm^{-1}$ as measured by a Raman spectrum is preferably 0.1 or more, more preferably 0.2 or more, even more preferably 0.4 or more, in particular preferably 0.6 or more. In a case where a carbonaceous shell layer having a large R value, i.e., a layer comprising an amorphous carbon material is provided on the surface of a graphite core particle, intercalation and deintercalation of lithium ions is easy, and the rapid charge-and-discharge characteristics of a lithium ion battery is improved.

The carbon coated graphite particles can be manufactured in accordance with a known method. For example, first, graphite powder is porphyrized to obtain graphite core particles finely powderized in a predetermined size. Subsequently, the graphite core particles are mixed while spraying an organic compound over them. Alternatively, graphite core particles and an organic compound such as pitch and phenol resin are mixed with a device such as a hybridizer from Nara Machinery Co., Ltd. to perform mechanochemical treatment.

There is no particular limitation for the organic compound, but it is preferably isotropic pitch, anisotropy pitch, resin, resin precursors or monomers. In a case where a resin precursor or a monomer is used, the resin precursor or the monomer are preferably polymerized to form resin. Suitable organic compounds include at least one selected from the group consisting of petroleum based pitch, coal based pitch, phenol resin, polyvinyl alcohol resin, furan resin, cellulose resin, polystyrene resin, polyimide resin and epoxy resin. The amount of a carbonaceous shell layer present on the surface of a graphite core particle can be adjusted by the coating amount of an organic compound. The coating amount of an organic compound is preferably not less than 0.05 parts by mass and not more than 10 parts by mass, more preferably not less than 0.1 parts by mass and not more than 10 parts by mass relative to 100 parts by mass of the graphite core particles. When the amount of carbonaceous shell layers is too much, battery capacity may be decreased.

Subsequently, graphite core particles coated by an organic compound are heat-treated at preferably not less than 200° C. and not more than 2000° C., more preferably not less than 500° C. and not more than 1500° C., even more preferably not less than 900° C. and not more than 1200° C. Carbon coated graphite particles are obtained by this heat treatment. When a temperature for the heat treatment is too low, the carbonization of an organic compound may not fully be completed, and hydrogen and oxygen may be left in the carbon particles (B), which may have a negative effect on battery characteristics. On the other hand, when a temperature for the heat treatment is too high, crystallization may progress too far, and charge characteristics may decline. The heat treatment is preferably performed under non-oxidizing atmospheres. Examples of Non-oxidizing atmospheres include an atmosphere in which inert gas such as argon gas and nitrogen gas is filled or a vacuum state. The carbon coated graphite particles are preferably pulverized to give a particle diameter as described above in order to use them as an electrode active material since they may be fused with each other to form lumps by the heat treatment. Further, the carbon coated graphite particles have a BET specific surface area of preferably not less than 0.5 $m^2/g$ and not more than 30 $m^2/g$, more preferably not less than 0.5 $m^2/g$ and not more than 10 $m^2/g$, even more preferably not less than 0.5 $m^2/g$ and not more than 5 $m^2/g$.

[Carbon Particles (B) Comprising a Poorly Crystalline Carbonaceous Material]

The carbon particles (B) according to another embodiment comprise a poorly crystalline carbonaceous material.

In this context, a poorly crystalline carbonaceous material refers to graphitizable carbon, non-graphitizable carbon, glassy carbon, amorphous carbon or low temperature calcined charcoal and the like. These poorly crystalline carbonaceous materials can be prepared in accordance with a known method.

For raw materials for poorly crystalline carbonaceous materials, petroleum derived substances such as heat heavy oil, pyrolytic oil, straight asphalt, blown asphalt, raw coke, needle coke, calcined coke, tar or pitch which is a by-product from the manufacture of ethylene, or the like; coal derived substances such as coal tar generated upon coal carbonization, heavy components in which low boiling point components of coal tar are removed by distillation, coal tar pitch, raw coke, needle coke, calcined coke, or the like; resin derived substances such as phenol resin, polyvinyl alcohol resin, furan resin, cellulose resin, polystyrene resin, polyimide resin or epoxy resin; plant derived substances such as coconut shell, chaff, coffee husks, bamboo coal, broad-leaved tree or needle-leaved tree can be used.

There is no particular limitation for a method of manufacturing a poorly crystalline carbonaceous material. Preferred manufacturing methods include a method comprising carbonizing the above raw materials at preferably not less than 800° C. and less than 2000° C., more preferably not less than 800° C. and not more than 1500° C., even more preferably not less than 1000° C. and not more than 1500° C. under an inert atmosphere.

The poorly crystalline carbonaceous material has a $d_{002}$ of preferably 0.400 nm or less, more preferably 0.385 nm or less, even more preferably 0.370 nm or less. The lower limit of $d_{002}$ is preferably 0.340 nm. Further, the poorly crystalline carbonaceous material preferably has a $L_c$ of 50 nm or less.

The poorly crystalline carbonaceous material has a BET specific surface area of preferably not less than 1 $m^2/g$ and not more than 10 $m^2/g$, more preferably not less than 1 $m^2/g$ and not more than 7 $m^2/g$.

(Multi-Walled Carbon Nanotubes (C))

The multi-walled carbon nanotubes (C) used for the present invention essentially have a fiber diameter of preferably not less than 5 nm and not more than 30 nm. In this context, the word "essentially" means that 95 or more fibers out of randomly selected 100 fibers have a range of the predetermined diameter. In the present invention, the fiber diameter is preferably not less than 5 nm and not more than 30 nm, more preferably not less than 7 nm and not more than 20 nm, even more preferably not less than 9 nm and not more than 15 nm. Multi-walled carbon nanotubes having a small fiber diameter are often difficult to be dispersed into a state where each of them is untangled. The multi-walled carbon nanotubes (C) having a large fiber diameter are often difficult to be manufactured by the supported catalyst method.

The mufti-walled carbon nanotubes used for the present invention may have a tubular structure in which a graphene sheet comprising carbon six membered rings is rolled in parallel to the fiber axis, a platelet structure in which a graphene sheet is perpendicularly arranged to the fiber axis or a herringbone structure in which a graphene sheet is rolled with an oblique angle. Among these, the multi-walled carbon nanotubes with a tubular structure are preferred in view of electric conductivity and mechanical strength.

The aspect ratio of the multi-walled carbon nanotubes as a raw material is preferably not less than 100 and not more than 1000, more preferably not less than 400 and not more than 1000. When the aspect ratio is small, the degree of entanglement between fibers tends to be weak, and effective electrically conductive networks are likely difficult to be formed. When the aspect ratio is large, the degree of entanglement between fibers tends to be strong, and dispersion tends to be difficult.

Further, the multi-walled carbon nanotubes (C) in the composite electrode material have an aspect ratio of preferably 100 or more, more preferably 200 or more, even more preferably 400 or more. Note that the upper limit of the aspect ratio of the multi-walled carbon nanotubes in the composite electrode material is not particularly limited, but is preferably 1000 in view of dispersion efficiency. In this context, the aspect ratio is a ratio of the average fiber length of the carbon nanotubes to the average fiber diameter of the carbon nanotubes. Even if the aspect ratio of the multi-walled carbon nanotubes as a raw material is high, the aspect ratio is generally decreased because the multi-walled carbon nanotubes may be fragmented by the shear force applied in the compounding step. In the present invention, however, the aspect ratio is preferably within the above ranges even in a case where the aspect ratio is decreased during compounding.

The BET specific surface area of the multi-walled carbon nanotubes (C) is preferably not less than 150 m$^2$/g and not more than 300 m$^2$/g, more preferably not less than 240 m$^2$/g and not more than 280 m$^2$/g, even more preferably not less than 250 m$^2$/g and not more than 270 m$^2$/g.

Further, the $C_0$ value of the multi-walled carbon nanotubes is preferably not less than 0.680 nm and not more than 0.690 nm. When the $C_0$ value of the carbon nanotubes is small, flexibility of the carbon nanotubes may be lost, and aggregates may be difficult to be untangled.

The oxidation starting temperature of the multi-walled carbon nanotubes (C) is preferably not less than 400° C. and not more than 550° C. In this context, the oxidation starting temperature is a temperature at which the weight is decreased by 0.1% in a thermobalance relative to the initial weight (the prepared amount) when heated to 1000° C. at 10° C./min under air flow. A lower oxidation starting temperature tends to cause more defects in carbon crystals.

The multi-walled carbon nanotubes (C) have a compressed specific resistance at the compressed density of 0.8 g/cm$^3$ of preferably not less than 0.014 Ω·cm and not more than 0.020 Ω·cm. Multi-walled carbon nanotubes with small compressed specific resistance tend to show low flexibility. Multi-walled carbon nanotubes with large compressed specific resistance tend to have a low electric conductivity imparting effect.

The multi-walled carbon nanotubes (C) used for the present invention are not particularly limited by synthesis methods thereof, but are preferably synthesized by gas phase methods. Among the gas phase methods, those synthesized by the supported catalyst method are preferred.

The supported catalyst method is a method in which carbon fibers are manufactured by reacting a carbon source in the gas phase using catalyst where catalyst metals are supported on inorganic supports.

Examples of the inorganic supports include alumina, magnesia, silica titania, calcium carbonate and the like. The inorganic supports are preferably in a form of powdered granular. Examples of the catalyst metals include iron, cobalt, nickel, molybdenum, vanadium and the like. Supporting can be performed by impregnating a support in a solution of a compound comprising a catalyst metal element, by performing co-precipitation of a solution of a compound comprising a catalyst metal element and a compound comprising an element which constitutes an inorganic support, or by other known methods of supporting.

Examples of the carbon sources include methane, ethylene, acetylene and the like. The reaction can be performed in a reaction vessel such as fluid bed, moving bed, fixed bed or the like. A temperature during the reaction is preferably set at 500° C. to 800° C. Carrier gas can be used in order to supply a carbon source to a reaction vessel. Examples of the carrier gas include hydrogen, nitrogen, argon and the like. A reaction time is preferably for 5 to 120 minutes.

Addition of the multi-walled carbon nanotubes (C) tends to improve the initial capacity of a lithium ion battery. The amount of the multi-walled carbon nanotubes (C) contained in the composite electrode material is preferably not less than 0.1 part by mass and not more than 10 parts by mass, more preferably not less than 0.5 part by mass and not more than 5 parts by mass relative to total 100 parts by mass of the particles (A) and the carbon particles (B).

(Carbon Nanofibers (D))

The carbon nanofibers (D) used for the present invention essentially have a fiber diameter of preferably not less than 50 nm and not more than 300 nm. In this context, the word "essentially" means that 95 or more out of randomly selected 100 fibers have a range of the predetermined diameter. In the present invention, the fiber diameter is preferably not less than 50 nm and not more than 300 nm, more preferably not less than 75 nm and not more than 250 nm, even more preferably not less than 100 nm and not more than 200 nm. The carbon nanofibers having a large fiber diameter usually have a small aspect ratio, and networks in a matrix such as resin may be often difficult to be efficiently formed. On the other hand, the carbon nanofibers having a small fiber diameter usually have a large aspect ratio, and thus are susceptible to aggregation, and may be not untangled in a matrix such as resin and often difficult to be dispersed.

Further, the mean fiber length of the carbon nanofibers (D) is preferably 0.4 or more, preferably 0.45 or more, even more preferably 0.5 or more relative to the 50% particle diameter of the carbon particles (B).

The BET specific surface area of the carbon nanofibers (D) is preferably not less than 6 m$^2$/g and not more than 40 m$^2$/g, more preferably not less than 8 m$^2$/g and not more than 25 m$^2$/g, even more preferably not less than 10 m$^2$/g and not more than 20 m$^2$/g.

Further, the $C_0$ value of the carbon nanofibers (D) is preferably not less than 0.676 nm and not more than 0.680 nm. When the $C_0$ value of the carbon nanofibers is larger than 0.680 nm, the electric conductivity tends to be decreased.

The oxidation starting temperature of the carbon nanofibers (D) is preferably not less than 600° C. and not more than 700° C. For the carbon nanofibers having an oxidation starting temperature of lower than 600° C., graphite crystals may not be fully developed.

The carbon nanofibers (D) have a compressed specific resistance of not less than 0.006 Ω·cm and not more than 0.017 Ω·cm at the compressed density of 0.8 g/cm$^3$. The carbon nanofibers having a compressed specific resistance of less than 0.006 Ω·cm may be difficult to be obtained. On the other hand, when a compressed specific resistance is larger than 0.017 Ω·cm, an electric conductivity imparting effect may be decreased.

The carbon nanofibers (D) used for the present invention are not particularly limited by synthesis methods thereof. For example, the carbon nanofibers (D) can be synthesized by gas phase methods. Further, the synthesized carbon nanofibers can be graphitized if desired, and the graphitized carbon nanofibers can be used as the carbon nanofibers (D). Among the gas phase methods, the carbon nanofibers synthesized by the floating catalyst method are preferred. The graphitization of the carbon nanofibers is preferably performed by a method comprising heat-treating the carbon nanofibers synthesized by gas phase methods at a temperature of not less than 2000° C. under an inert atmosphere.

The floating catalyst method is a method in which carbon fibers are obtained by introducing a raw material liquid or a gasification product thereof where ferrocene and a sulfur compound as a catalyst source is dissolved in benzene as a carbon source into a flow reactor furnace heated at 1000° C. or higher using carrier gas such as hydrogen. Generally, a hollow tube is formed starting at the catalyst metal in the initial stage of the reaction, and an approximate length of the carbon fiber is determined. Subsequently, pyrolyzed carbon is deposited on the surface of the hollow tube, and the growth of the fiber in a radial direction progresses, forming a growth ring-like carbon structure. Therefore, the fiber diameter can be adjusted by controlling a deposited amount of the pyrolyzed carbon on the carbon fiber during the reaction: i.e. a reaction time, a concentration of the raw material in the atmosphere and a reaction temperature. The carbon nanofibers obtained by this reaction may have low electric conductivity since they are covered with pyrolyzed carbon having low crystallinity. Accordingly, in order to increase the crystallinity of the carbon fibers, preferably, heat treatment is performed at 800 to 1500° C. under an inert gas atmosphere such as argon, and then graphitization treatment is performed at 2000 to 3000° C. The graphitization treatment allows evaporative removal of the catalyst metal to make the carbon fibers highly pure.

For the carbon nanofibers (D) obtained in this way, the length of the fibers can be adjusted by a mill, or branches of the branched carbon fibers can be snapped. Less branched carbon nanofibers has low interference between the fibers, and therefore, lumps in which carbon nanofibers are entangled can be easily compressed, and in addition, the lumps may be untangled to be easily dispersed.

Addition of the carbon nanofibers (D) tends to improve the capacity maintenance ratio of a lithium ion battery. The amount of the carbon nanofibers (D) is preferably not less than 0.5 part by mass and not more than 20 parts by mass, more preferably not less than 1 part by mass and not more than 15 parts by mass relative to total 100 parts by mass of the particles (A) and the carbon particles (B).

[Electrically Conductive Carbon Particles (E)]

The composite electrode material in the present invention may further comprise the electrically conductive carbon particles (E). The electrically conductive carbon particles (E) used for the present invention have a number average primary particle diameter of preferably not less than 20 nm and not more than 100 nm, more preferably not less than 30 nm and not more than 50 nm. Examples of the carbon particles include carbon black based electrically conductive particles such as acetylene black, furnace black, ketjen black and the like. Addition of the electrically conductive carbon particles (E) tends to improve the initial capacity of a lithium ion battery. Note that the primary particle diameter is the mean value in number based particle size distribution.

The amount of the electrically conductive carbon particles (E) is preferably not less than 0.1 part by mass and not more than 10 parts by mass relative to total 100 parts by mass of the particles (A) and the carbon particles (B).

Figure 1:
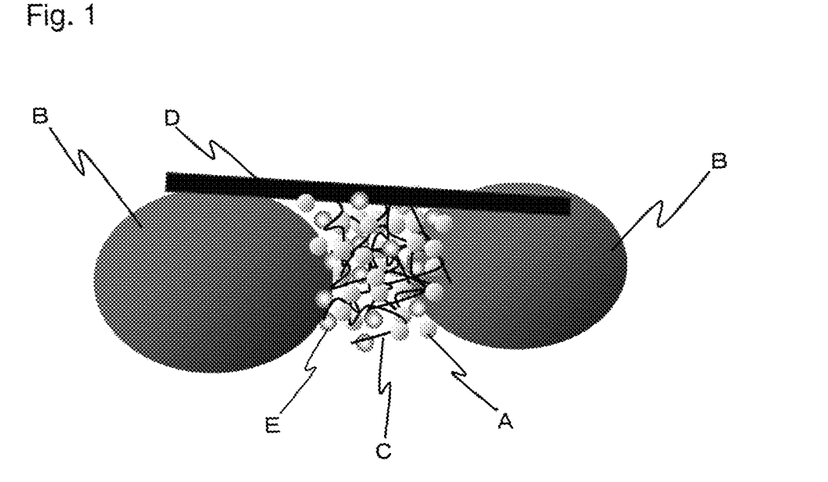
FIG. 1 shows a conceptual diagram illustrating a composite electrode material according to one embodiment.
Figure 2:
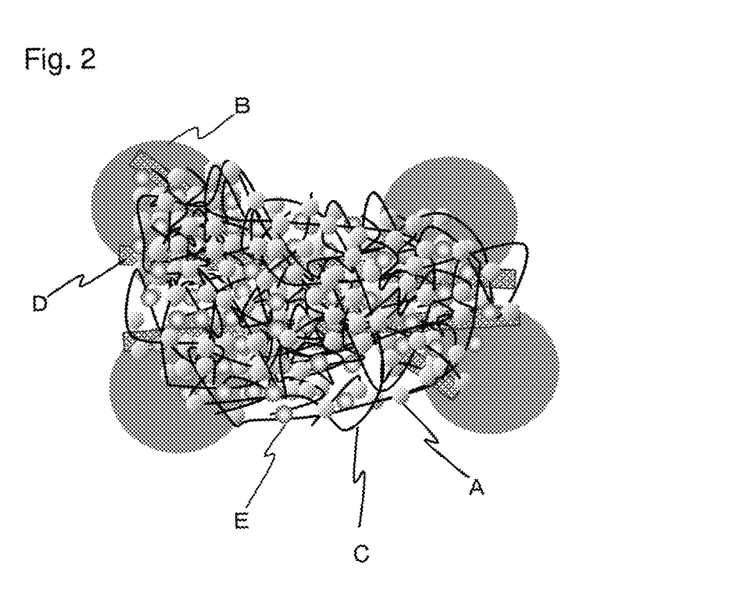
FIG. 2 shows a conceptual diagram illustrating a composite electrode material according to one embodiment.

In the composite electrode material according to a preferred embodiment in the present invention, as shown in FIG. 1 or 2, the carbon nanofibers (D) are cross-linked with two or more of the carbon particles (B), and the multi-walled carbon nanotubes (C) are cross-linked with two or more of the particles (A), and the multi-walled carbon nanotubes (C) are present between two or more of the carbon particles (B) and two or more of the carbon nanofibers (D).

The carbon nanofibers (D) cross-linked with the carbon particles (B) form electrically conductive pathways between the carbon particles (B). The cross-linked carbon nanofibers (D) have an effect to control expansion and contraction of an electrode structure, and can easily provide a battery having a high capacity maintenance ratio. Further, the multi-walled carbon nanotubes (C) cross-linked with the particles (A) form electrically conductive pathways between the particles (A). Further, the multi-walled carbon nanotubes (C) present between two or more of the carbon particles (B) and two or more of the carbon nanofibers (D) helps to conduct electricity between the carbon particles (B) and the carbon nanofibers (D). By this, the capacity of the particles (A) with poor electric conductivity can be fully utilized. Even when the contacts between adjacent particles are lost by expansion and contraction, the carbon nanofibers (D) or the multi-walled carbon nanotubes (C) can maintain electrically conductive pathways.

Figure 3:
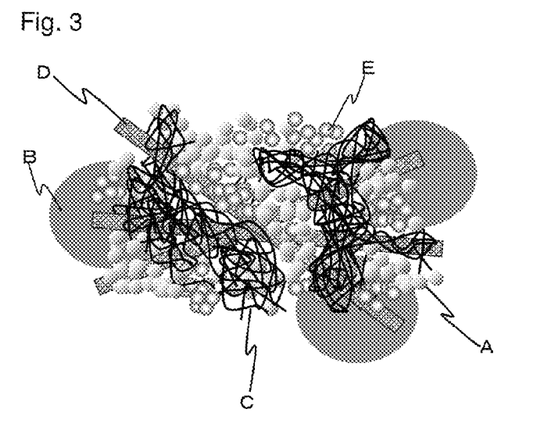
FIG. 3 shows a conceptual diagram illustrating a composite electrode material according to one embodiment.

The composite electrode material according to a preferred embodiment in the present invention does not essentially comprise aggregates of the carbon nanotubes (C) with an aggregate size of 1 μm or more. The phrase "does not essentially comprise multi-walled carbon nanotube aggregates having an aggregate size of 1 μm or more" means that when the composite electrode material are randomly observed at 10 fields (the area of one field: 70 μm×70 μm) under a scanning electron microscope at a magnification of 2 k times, a multi-walled carbon nanotube aggregate having an aggregate size of 1 μm or more is observed only in one field or less. In a case where aggregates of the carbon nanotubes (C) remains as shown in FIG. 3, electrically conductive networks having fewer contacts with the particles (A) and the electrically conductive carbon particles (E) will be formed. In a case where aggregates of the carbon nanotubes (C) are untangled as shown in FIG. 2 and the size of the aggregates decrease, electrically conductive networks having more contacts with the particles (A) and the electrically conductive carbon particles (E) will be formed.

The composite electrode material according to one embodiment in the present invention can be obtained, for example, by the following method.

First, the particles (A), the carbon particles (B), the multi-walled carbon nanotubes (C), the carbon nanofibers (D) and optionally the electrically conductive carbon particles (E) are uniformly mixed using a mixer which can apply shearing stress such as a double planetary mixer (for example, PRIMIX Hivis Mix). To this mixture, an aqueous solution of water soluble resin such as aqueous carboxymethyl cellulose (CMC, for example, Daicel FineChem. Ltd.) is added, and further kneaded with shearing stress applied. The viscosity of the kneaded material is adjusted, and then a binder such as an aqueous dispersion of styrene-butadiene rubber (SBR, for example, Zeon Corp.) is added and further kneaded. The carbon particles (B) and the carbon nanofibers (D) are relatively easily untangled and dispersed. On the other hand, the particles (A) and the multi-walled carbon nanotubes (C) are relatively difficult to be untangled and dispersed. When mixing and kneading are performed with shearing stress applied as described above, the carbon particles (B) and the carbon nanofibers (D) serves as dispersing media, and the particles (A) and the multi-walled carbon nanotubes (C) are easily untangled. As a result, uniform and three-dimensional electrically conductive networks by the carbon particles (B), the multi-walled carbon nanotubes (C) and the carbon nanofibers (D) can be formed.

The composite electrode material according to one embodiment in the present invention can be contained in an electrode sheet. An electrode sheet usually has a current collector and an electrode layer coated on the current collector. The composite electrode material according to one embodiment in the present invention is usually contained in the electrode layer.

Examples of the current collectors include nickel foil, copper foil, nickel mesh, copper mesh or the like. Further, the current collector may have an electrically conductive metal foil and an electrically conductive layer coated thereon. The electrically conductive layers include a layer comprising an electrical conductivity imparting agent such as electrically conductive carbon particles and binder. The electrode layer may comprise binder in addition to the composite electrode material according to one embodiment in the present invention.

The binders can be used for an electrode layer or an electrically conductive layer, examples of the binders include polyethylene, polypropylene, ethylene-propylene terpolymer, butadiene rubber, styrene-butadiene rubber, butyl rubber, acrylic rubber, high molecular compounds having large ionic conductivity and the like. Examples of the high molecular compounds having large ionic conductivity include, poly(vinylidene fluoride), polyethylene oxide, polyepichlorohydrin, polyphosphazene, polyacrylonitrile and the like. The amount of the binder is preferably 0.5 to 100 parts by mass relative to 100 parts by mass of the composite electrode material.

There is no particular limitation for the electric conductivity imparting agents which can be used for the electrically conductive layer as long as they serve to give electric conductivity between the electrode layer and the current collector. For example, they include vapor-grown carbon fibers (for example, "VGCF" from Showa Denko K.K.), electrically conductive carbon (for example, "Denka Black" from Denki Kagaku Kogyo K.K., "Super C65" from TIMCAL Graphite & Carbon, "Super C45" from TIMCAL Graphite & Carbon, "KS6L" from TIMCAL Graphite & Carbon) and the like.

An electrode layer can be obtained by, for example, applying paste containing binder and composite electrode material to current collector and then drying. The paste can be obtained, for example, by kneading composite electrode material, binder and optionally solvent. The paste can be fabricated in a form such as sheet, pellet and the like.

There is no particular limitation for the solvents, examples thereof including N-methyl-2-pyrrolidone, dimethylformamide, isopropanol, water and the like. In the case of a binder in which water is used as a solvent, combined use of a thickener is preferred. The amount of the solvent is adjusted to give a value of viscosity where the paste can be easily applied to current collector.

There is no particular limitation for methods of applying the paste. The electrode layer usually has a thickness of 50 to 200 μm. When the thickness of the electrode layer is too thick, a standardized battery housing may not be able to accommodate the electrode sheet. The thickness of the electrode layer can be adjusted by the applied amount of the paste. Further, it can be adjusted by performing pressure molding after drying the paste. Examples of the methods of pressure molding include the roll pressure molding method, the stamp pressure molding method and the like.

The electrode layer in which the composite electrode material according to one embodiment in the present invention is employed has a volume resistivity of preferably 0.5 Ω·cm or less when unpressed as measured by the four probe method. In the composite electrode material according to a preferred embodiment in the present invention, such volume resistivity can be achieved because the particles (A), the carbon particles (B), the multi-walled carbon nanotubes (C), the carbon nanofibers (D) and optionally the electrically conductive carbon particles (E) are appropriately entangled, and uniformly dispersed without large aggregates (linkle) to form tight electrically conductive networks.

(Lithium Ion Battery)

The lithium ion battery according to one embodiment in the present invention comprises at least one selected from the group consisting of nonaqueous electrolytic solution and nonaqueous polymer electrolyte, a positive electrode sheet and a negative electrode sheet. For the negative electrode sheet, an electrode sheet comprising the composite electrode material according to one embodiment in the present invention can be used.

For the positive electrode sheet used for the present invention, a sheet conventionally used for a lithium ion battery, specifically, a sheet comprising a positive electrode active material can be used. Any one or more of the conventional materials known as a positive electrode active material for a lithium based battery (materials capable of intercalating and deintercalating lithium ions) may be appropriately selected for use. Among these, lithium-containing metal oxides capable of intercalating and deintercalating lithium ions are suitable. Examples of the lithium-containing metal oxides include composite oxides comprising elemental lithium and at least one element selected from Co, Mg, Cr, Mn, Ni, Fe, Al, Mo, V, W, Ti and the like. Specific examples of the positive electrode active materials include $LiNiO_2$, $LiCoO_2$, $LiMn_2O_4$, $LiNi_{0.34}Mn_{0.33}Co_{0.33}O_2$, $LiFePO_4$ and the like.

There is no particular limitation for the nonaqueous electrolytic solutions and the nonaqueous polymer electrolytes used for a lithium ion battery. They include, for example, organic electrolytic solutions in which a lithium salt such as $LiClO_4$, $LiPF_6$, $LiAsF_6$, $LiBF_4$, $LiSO_3CF_3$, $CH_3SO_3L_1$, $CF_3SO_3Li$ and the like is dissolved in nonaqueous solvent such as ethylene carbonate, diethyl carbonate, dimethyl carbonate, ethylmethyl carbonate, propylene carbonate, butylene carbonate, acetonitrile, propionitrile, dimethoxyethane, tetrahydrofuran, γ-butyrolactone and the like; gel polymer electrolytes containing polyethylene oxide, polyacrylonitrile, poly(vinylidene fluoride), polymethylmethacrylate or the like; solid polymer electrolytes containing a polymer having an ethylene oxide bonding.

Further, to the electrolytic solution, a small amount of a substance undergoing a decomposition reaction when charging the lithium ion battery for the first time may be added. Such substances include, for example, vinylene carbonate (VC), biphenyl, propanesultone (PS), fluoroethylene carbonate (FEC), ethylene sulfite (ES) and the like. The amount to be added is preferably 0.01 to 30% by mass.

A separator can be provided between the positive electrode sheet and the negative electrode sheet in the lithium ion battery in the present invention. The separators include, for example, nonwoven fabrics, cloths; microporous films; and a combination thereof, which comprise polyolefines such as polyethylene, polypropylene and the like as a main component.

EXAMPLES

Examples of the present invention will be described below to illustrate the present invention in more detail. Note that these are shown for merely illustrative purposes. The present invention shall not be construed as limited thereto in any way.

Properties and the like of the multi-walled carbon nanotubes (C) and the carbon nanofibers (D) were measured as follows.

[Scanning Electron Microscope Observation]

A sample of powder was adhered to a strip of carbon tape and subjected to gold deposition to give an observation sample, which was then observed by JSM-6390 from JEOL Ltd.

(Fiber Diameter of the Carbon Nanofibers)

A fiber diameter was measured for 100 fibers or more at a magnification of 20 k times under the scanning electron microscope. The fiber diameter distribution and the mean fiber diameter were evaluated from them.

(Fiber Length of the Carbon Nanofibers)

The fibers were panoptically photographed at a magnification of 10 k times or higher under the scanning electron microscope, and a field was prepared in which the both ends of a fiber can be measured. Length was measured for 100 fibers or more, which were then averaged to give the fiber length.

[Transmission Electron Microscope Observation]

A sample of powder in a small amount was transferred in ethanol, and dispersed by ultrasonic irradiation, which was held at a carbon micro grid (with a supporting membrane). This, in turn, was used as an observation sample, and observed with Hitachi 9500.

(Fiber Diameter of the Multi-Walled Carbon Nanotubes)

A fiber diameter was measured for 100 fibers or more at a magnification of 100 k times under the transmission electron microscope. The fiber diameter distribution and the mean fiber diameter were evaluated from them.

(Fiber Length of the Multi-Walled Carbon Nanotubes)

The fibers were panoptically photographed at a magnification of 100 k times or higher under the transmission electron microscope, and a field was prepared in which the both ends of a fiber can be measured. Length was measured for 50 fibers or more, which were then averaged to give the fiber length.

(Specific Surface Area)

Yuasa Ionics NOVA 1000 was used to measure an amount of nitrogen gas adsorbed under the liquid nitrogen temperature (77K) to compute it by the BET method.

($C_0$ Measurements)

Using horizontally arranged sample multiple-purpose X-ray diffractometer (UltimaIV, Rigaku Corporation), measurements were performed using silicon powder as an internal standard in accordance with the Gakushin method ("Latest Carbon Material Experimental Technique (Measurement/Analysis)", edited by Carbon Society of Japan).

(Thermal Analysis)

EXSTAR 6000 TG/DTA from SII Nanotechnology was used for the thermal analysis. On a platinum pan, 10 mg of a sample was placed. Measurement conditions for the thermal analysis are as follows: heating to 1000° C. at 10° C./min under air flow at 100 ml/min.

(Metal Concentration in the Multi-Walled Carbon Nanotubes and the Carbon Nanofibers)

A sample of 20 to 40 mg was taken to a fluoroplastic beaker, and 2 ml of sulfuric acid was added. A fluoroplastic watch glass was placed on the beaker, which was then placed on a ceramic heater set at 300° C., and heated for 30 minutes. Then, it was left to cool down for 5 minutes. To this, 0.5 ml of nitric acid was added, and further heated. The addition of nitric acid as described above was repeated until the content disappeared by visual inspection. This was cooled to room temperature, and then about 20 ml of pure water and 0.5 ml of 50% hydrofluoric acid were added, and heated on a 60 to 70° C. hot plate for 2 hours. The content of the beaker was transferred to a polypropylene container to give a volume of 50 ml, and then iron and molybdenum were quantified with an ICP emission analysis system (SII Nanotechnology, Vista-PRO).

(Compressed Specific Resistance)

Figure 9:
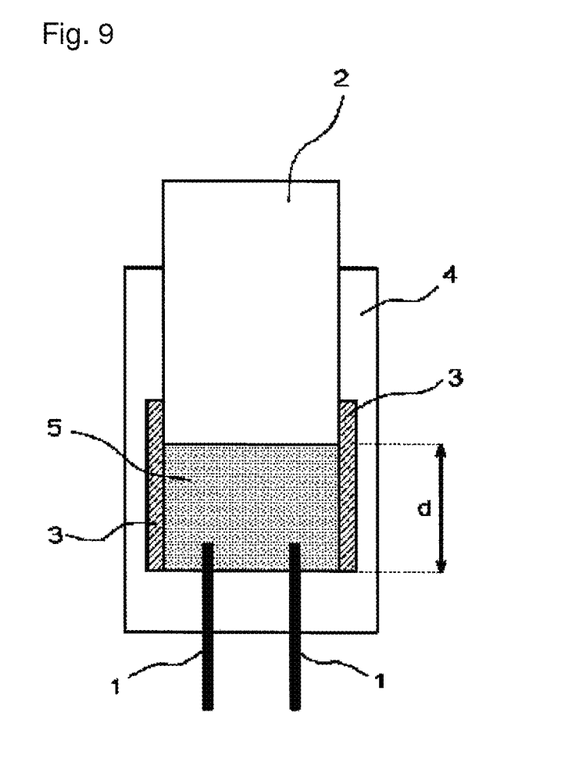
FIG. 9 shows the longitudinal section of a cell for measuring powder resistance.

A measurement jig shown in FIG. 9 was used. A cell which is made of resin and has an inside dimension of 4 cm in width×1 cm in depth×10 cm in height, is provided with Electric current terminal 3 of a copper plate for applying electric current to Analyte 5 and Voltage measurement terminal 1 in the middle. A fixed amount of a sample is placed in Cell 4, and then force is applied to Compression rod 2 from above to compress the sample. Electric current at 0.1 A was allowed to flow through the sample, and when a bulk density was 0.8 g/cm$^3$, a value of the voltage between two Voltage measurement terminals 1 inserted from the bottom of the container and separated by 2.0 cm was read to calculate the specific resistance R from the following formula.

$$R=(E/0.1)\times D/2$$

wherein R is the specific resistance [Ω·cm], D is the cross section area of powder in the direction of electric current (a product of d and the depth of 1 cm in the figure) [cm$^2$] and E is the voltage between the terminals [V].

The specific resistance varies depending on pressure conditions. The specific resistance is high under low pressure while it becomes lower as pressure increases. Above a certain pressure value, it shows an almost constant value. In this Example, the specific resistance when compressed to a bulk density of 0.8 g/cm$^3$ is designated as compressed specific resistance.

The Multi-Walled Carbon Nanotubes (C)

Manufacturing Example 1

Aluminium hydroxide (Showa Denko K.K., HIGILITE® M-43) was heat treated at 850° C. for 2 hours under the atmosphere in which air was flowing to prepare a support.

To a 300 ml tall beaker, 50 g of pure water was added, and then 4.0 g of the support was added and dispersed to prepare a support slurry.

To a 50 ml beaker, 16.6 g of pure water was added, and then 0.32 g of hexaammonium heptamolybdate tetrahydrate (Junsei Chemical Co., Ltd.) was added and dissolved. Then, 7.23 g of iron (III) nitrate nonahydrate (Kanto Chemical Co., Inc.) was added and dissolved to prepare a catalyst solution.

Further, 32.7 g of pure water was added to another 50 ml beaker, and then 8.2 g of ammonium carbonate (Kanto Chemical Co., Inc.) was added and dissolved to prepare a pH adjustment solution.

A stirring bar was placed in the tall beaker containing the support slurry, and stirred on a magnetic stirrer. Each of the catalyst solution and the pH adjustment solution was added dropwise to the support slurry with a Pasteur pipette while monitoring a pH meter to maintain a pH value of the slurry at 6.0±0.1. It took 15 minutes before all of the catalyst solution was added to the support slurry. The content in the tall beaker was separated on a filter paper (5C), and 50 g of pure water was sprinkled over the cake on the filter paper for washing. The washed filter cake was transferred to a magnetic dish, and dried in a 120° C. hot air oven for 6 hours. The resulting dried material was pulverized on a mortar to obtain a catalyst for synthesizing the multi-walled carbon nanotubes.

On a quartz boat, placed was 1.0 g of the resulting catalyst. This, in turn, was placed at the center of a horizontal tubular furnace (a quartz tube: inside diameter: 50 mm, length: 1500 mm, soaking zone: 600 mm). The horizontal tubular furnace was heated to 680° C. in 30 minutes with nitrogen gas flowed therethrough at 500 ml/min. Then, the nitrogen gas supply was stopped, and a mixed gas of ethylene and hydrogen (the concentration of ethylene: 50% by volume) was then supplied at 2000 ml/min, and allowed to react for 20 minutes to synthesize the multi-walled carbon nanotubes. The mixed gas supply was stopped, and nitrogen gas was supplied. After cooled down to room temperature, the multi-walled carbon nanotubes (C-1) were taken out from the furnace. The fiber form and powder properties of the resulting multi-walled carbon nanotubes (C-1) are shown in Table 1.

The multi-walled carbon nanotubes (C-1) were fed to a jet mill STJ-100 from Seishin Enterprise Co., Ltd. at 6 kg/h for porphyrization under the conditions of a pusher nozzle pressure of 0.64 MPa and a gliding nozzle pressure of 0.60 MPa to obtain the multi-walled carbon nanotubes (C-2). The aggregates contained in the multi-walled carbon nanotubes form and powder properties of the resulting multi-walled carbon nanotubes (C-2) are shown in Table 1.

The Carbon Nanofibers (D)

Manufacturing Example 2

A reactor comprising a reaction tube with an inside diameter of 370 mm and a length of 2000 mm and a heater was prepared. Two fluid mixing nozzles for supplying a raw material were provided at the upper part of the reaction tube, and a conveyor was arranged at the lower part of the reaction tube, which was connected to a tank with a bag filter installed. Inflammable gas passed through the bag filter was burned in an incinerator.

In order to prepare a liquid raw material (3.5% by mass of ferrocene and 0.08% by mass of sulfur in the liquid raw material), 0.49 kg of ferrocene and 0.01 kg of sulfur were dissolved in 13.5 kg of benzene.

The liquid raw material and hydrogen were fed at 360 g/min and 700 NL/min, respectively. The liquid raw material was sprayed into the reaction tube through the two fluid nozzles and allowed to pass through the reaction tube heated at 1300° C. to synthesize the carbon nanofibers (D-1). After feeding the raw material for 2 hours, the supply of the liquid raw material and hydrogen was stopped, and nitrogen was then supplied to expel inflammable gas.

A graphite crucible (outside diameter: 100 mm, inside diameter: 85 mm, length: 200 mm) was filled with 80 g of the carbon nanofibers (D-1), and placed in a calcination furnace (inside diameter: 120 mm). It was heated to 1200° C. in 4 hours under argon atmosphere, and the temperature was held for 1 hour to remove a tar component. After that, the calcined product recovered from the graphite crucible was pulverized for 1 minute with a juicer mixer (Panasonic fiber mixer MX-X57) to obtain the carbon nanofibers (D-2). The fiber form and powder properties of the carbon nanofibers (D-2) are shown in Table 1.

A graphite crucible was filled with the carbon nanofibers (D-2), and placed in a high-frequency heating furnace (inside diameter: 120 mm). It was heated to 2800° C. in 4 hours under argon atmosphere, and the temperature was held for 1 hour. Then, the product taken out from the graphite crucible was pulverized with a Yakushin Kikai Seisakusyo stream mill KV-3 lab unit at a rotating speed of 5000 rpm to obtain the carbon nanofibers (D-3). The fiber form and powder properties of the carbon nanofibers (D-3) are shown in Table 1.

TABLE 1

| | Fiber dia. [nm] | Fiber length [μm] | Aspect ratio | Press densified specfic resistance [Ωcm] | Specific surface area [m$^2$/g] | $C_0$ [nm] | Oxidation starting temp. [deg C.] | Impurity Fe [ppm] | Impurity Mo [ppm] |
|---|---|---|---|---|---|---|---|---|---|
| Carbon nanotube(C) | | | | | | | | | |
| C-1 | 10 | 4.5 | 450 | 0.0162 | 260 | 0.683 | 460 | 12000 | 2000 |
| C-2 | 10 | 4.0 | 400 | 0.0178 | 260 | 0.683 | 460 | 12000 | 2000 |
| Carbon nanofiber(D) | | | | | | | | | |
| D-2 | 180 | 7.5 | 42 | 0.0424 | 14 | 0.693 | 510 | 14000 | N.D. |
| D-3 | 180 | 7.2 | 40 | 0.0151 | 13 | 0.677 | 660 | 10 | N.D. |

(C-2) showed a 50% particle size $D_{50}$ in the volume based accumulative particle size distribution of 10 μm. The fiber The properties and the like of the particles A and the carbon particles B were measured by the following method.

(Particle Diameter)

Two ultra-small spatulas of powder and two drops of nonionic surfactant (Triton-X; Roche Applied Science) were added to 50 ml of water, and ultrasonic dispersion was performed for 3 minutes. This dispersion liquid was introduced into a laser diffraction particle size distribution measurement system (LMS-2000e) from Seishin Enterprise Co., Ltd. to measure volume based accumulative particle size distribution.

(Raman R Value)

Measurements were performed using a JASCO laser Raman spectrometer (NRS-3100) under the following conditions: the excitation wavelength of 532 nm; the incident slit width of 200 μm; the exposure time of 15 seconds; the integration time of 2 times; the diffraction grating of 600/mm. The ratio ($I_D/I_G$) of the intensity $I_D$ of the peak around 1360 cm$^{-1}$ (from an amorphous component) and the intensity $I_G$ of the peak around 1580 cm$^{-2}$ (from a graphite component) was computed from the measured spectrum. This was taken as the R value, an indicator of the degree of graphitization.

($d_{002}$, $L_c$)

The interplanar spacing $d_{002}$ and the size in the c axis direction of the crystallite $L_c$ was obtained from the 002 diffraction line in the powder X ray diffraction.

(The Particles A)

Si particles (the number average primary particle diameter of 50 nm) were prepared. This was taken as the particles (A-1).

(The Carbon Particles B)

Manufacturing Example 3

Petroleum based coke was pulverized to give the mean particle diameter of 5 μm. This was heat treated at 3000° C. in an Acheson furnace to obtain graphite particles in which the BET specific surface area was 3.2 m$^2$/g; the $d_{002}$ was 0.3363 nm; the $L_c$ was 61 nm; the 10% particle diameter (D10) was 2.5 μm; the 50% particle diameter (D50) was 5.1 μm; the 90% particle diameter (D90) was 12.3 μm; and the $I_D/I_G$ (the R value) was 0.06. This was taken as the carbon particles (B-1).

Manufacturing Example 4

Graphite particles having the 50% particle diameter (D50) of 12 μm were obtained by the similar method as in Manufacturing Example 3. This was taken as the carbon particles (B-2).

[Electrically Conductive Carbon Particles]

Carbon black (Timcal Graphite & Carbon, SUPER-C65) was prepared. This was taken as the electrically conductive carbon particles (E-1).

Example 1

Manufacture of a Negative Electrode Sheet

A water dispersion of styrene-butadiene rubber (SBR) was prepared as a binder.

White powder of carboxymethyl cellulose (CMC) was mixed with purified water, and stirred with the stirrer for one whole day to obtain a CMC gel.

One part by mass of the particles (A-1) and 9 parts by mass of the carbon particles (B-1) were mixed to give a negative electrode active material.

To the above negative electrode active material, 0.291 part by mass of the carbon nanofibers (D-3) and 0.0323 part by mass of the multi-walled carbon nanotubes (C-2) were added and mixed. The mixture was introduced into a double planetary mixer to perform mixing in the presence of shear force. Subsequently, a small amount of the CMC gel was added to it, and further kneaded in the presence of shear force. An appropriate amount of water was added to adjust viscosity, and further kneaded. To obtain a paste for the negative electrode, 0.2 part by mass (solid content) of the water-dispersed SBR was added, and further mixed.

The paste for the negative electrode was applied on a copper foil so that the thickness of the negative electrode layer is 100 μm, which was then vacuum dried. From the resulting sheet, a piece having a diameter of 16 mm was punched out. The piece of the sheet was vacuum dried for 12 hours at 50° C. to obtain the negative electrode sheet.

(SEM (Scanning Electron Microscope) Observation)

Figure 4:
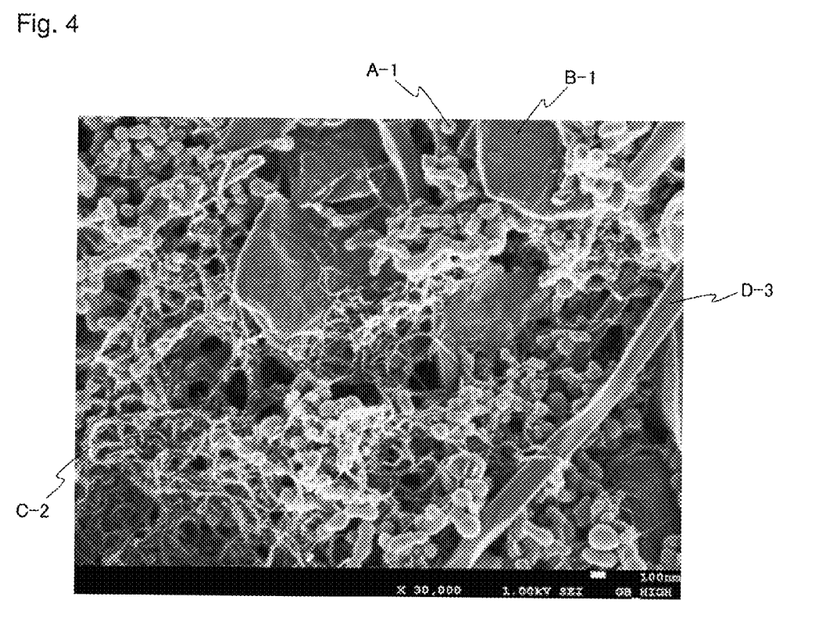
FIG. 4 shows an electron microscope image of the composite electrode material obtained in Example 1.

Using JEOL QUICK AUTO COATER with PRESET set to 20, the surface of the sample was sputtered with platinum. Next, using JEOL FE-SEM (JSM-7600F) with the column mode set to SEI (acceleration voltage: 5.0 kV), observation was performed. An example of the SEM observation images is shown in FIG. 4. It appears that the multi-walled carbon nanotubes (C-2) are cross-linked with two or more of the particles (A-1), and the particles (A-1) adhere to the multi-walled carbon nanotubes (C-2) like root nodules. Further, it shows that the carbon nanofibers (D-3) are cross-linked with the carbon particles (B).

(Preparation of a Battery for Evaluation)

The following operations were performed within a glove box maintained under a dry argon gas atmosphere with a dew point of −80° C. or less.

A coin cell of Model 2320 (diameter: 23 mm and thickness: 20 mm) was prepared. A piece of foil having a diameter of 17.5 mm was punched out from a lithium foil with a thickness of 1 mm. The piece of the lithium foil was placed in a cap of the coin cell. Next, an electrolytic solution was injected into the coin cell. Then, a separator and a negative electrode sheet were placed in this order, and the case of the coin cell was caulked with the cap of the coin cell, and sealed to obtain a lithium ion battery for evaluation. Note that as an electrolytic solution, used was a mixture in which an electrolyte LiPF$_6$ was dissolved in a concentration of 1.0 mol/L in a solvent in which ethylene carbonate, ethylmethyl carbonate and diethyl carbonate were mixed in a volume ratio of 3:5:2.

(Charge and Discharge Test)

Using the lithium ion battery for evaluation, constant current charge was performed at 0.2 mA/cm$^2$ from the rest potential to 5 mV. Then, constant current discharge was performed at 0.2 mA/cm$^2$, and cut off at 1.5 V. This charge and discharge operation is defined as one cycle, and 20 cycles were performed.

The initial capacity [mAh/g] was defined as a value calculated by dividing the discharge capacity at the first cycle by the total weight of the particles (A) and the carbon particles (B), and the capacity maintenance ratio [%] was defined as a proportion of the discharge capacity at the 20th cycle relative to the discharge capacity at the first cycle. The results are shown in Table 2.

Example 2

A negative electrode sheet was obtained by the same method as in Example 1 except that the amount of the carbon nanofibers (D-3) was changed to 0.226 part by mass, and the amount of the multi-walled carbon nanotubes (C-2) was changed to 0.0969 part by mass. The initial capacity and the capacity maintenance ratio were determined by the same method as in Example 1. The results are shown in Table 2.

Example 3

A negative electrode sheet was obtained by the same method as in Example 1 except that the carbon particles (B-2) were substituted for the carbon particles (B-1). The initial capacity and the capacity maintenance ratio were determined by the same method as in Example 1. The results are shown in Table 2.

Comparative Example 1

Figure 5:
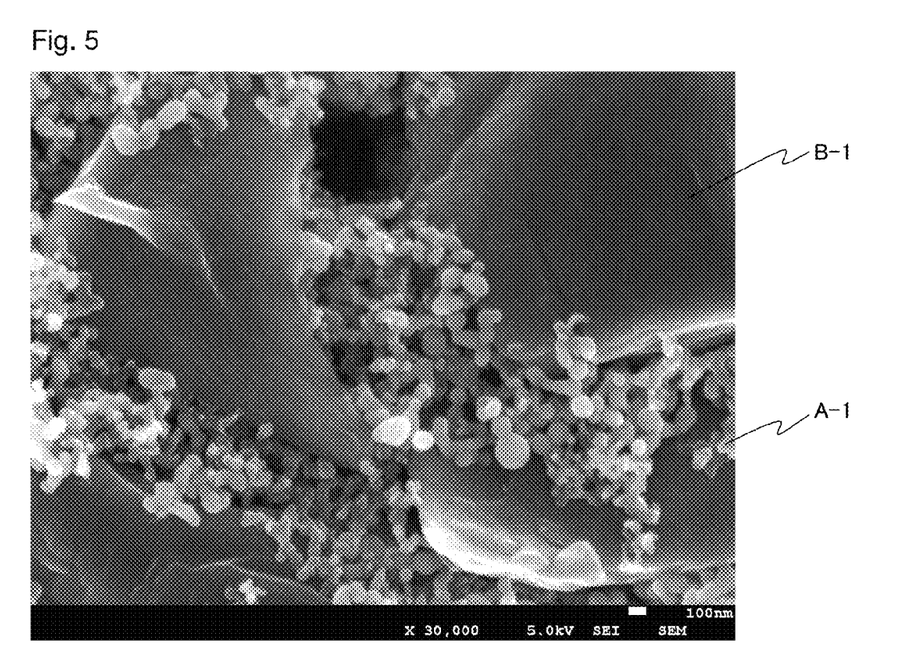
FIG. 5 shows an electron microscope image of the composite electrode material obtained in Comparative Example 1.

A negative electrode sheet was obtained by the same method as in Example 1 except that the carbon nanofibers (D-3) and the multi-walled carbon nanotubes (C-2) were not added. The initial capacity and the capacity maintenance ratio were determined by the same method as in Example 1. The results are shown in Table 2. An example of the SEM observation images is shown in FIG. 5.

Comparative Example 2

A negative electrode sheet was obtained by the same method as in Example 1 except that 0.667 part by mass of the electrically conductive carbon particles (E-1) was added instead of the carbon nanofibers (D-3) and the multi-walled carbon nanotubes (C-2). The initial capacity and the capacity maintenance ratio were determined by the same method as in Example 1. The results are shown in Table 2.

Comparative Example 3

Figure 6:
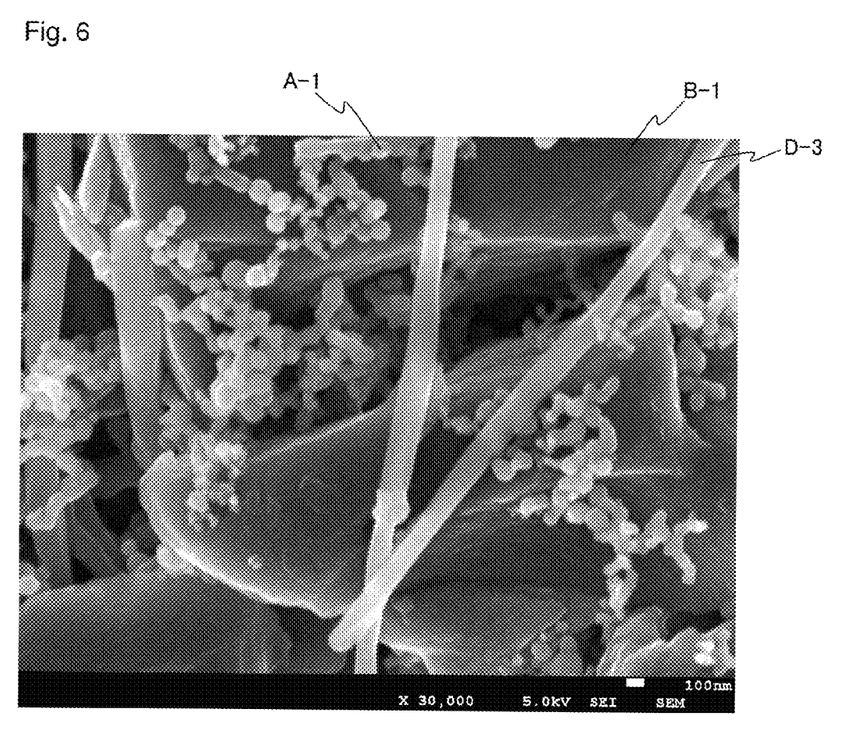
FIG. 6 shows an electron microscope image of the composite electrode material obtained in Comparative Example 3.

A negative electrode sheet was obtained by the same method as in Example 1 except that the amount of the carbon nanofibers (D-3) was changed to 0.323 part by mass, and the multi-walled carbon nanotubes (C-2) was not added. The initial capacity and the capacity maintenance ratio were determined by the same method as in Example 1. The results are shown in Table 2. An example of the SEM observation images is shown in FIG. 6.

Comparative Example 4

Figure 7:
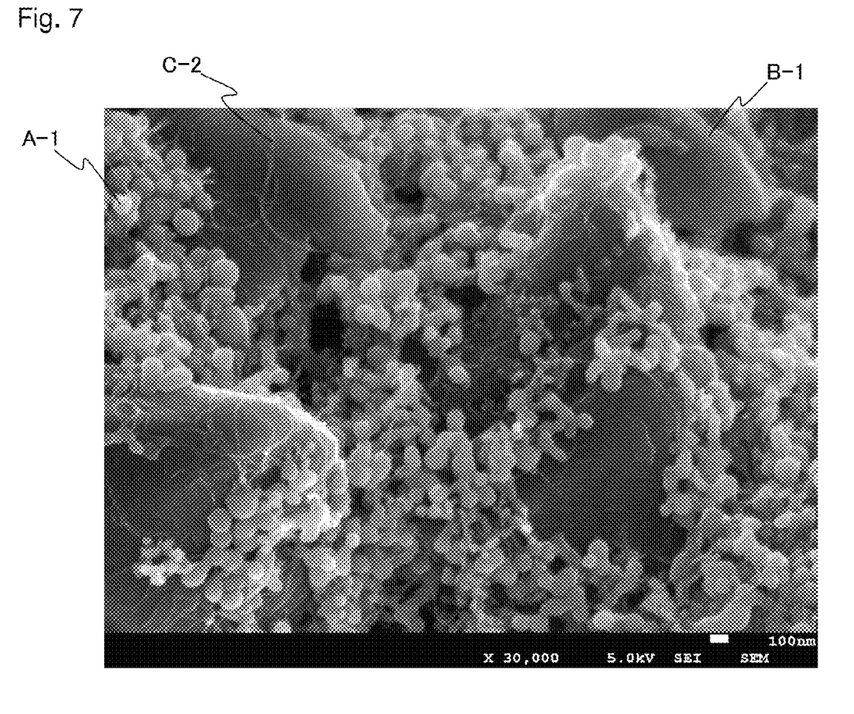
FIG. 7 shows an electron microscope image of the composite electrode material obtained in Comparative Example 4.

A negative electrode sheet was obtained by the same method as in Example 1 except that the amount of the multi-walled carbon nanotubes (C-2) was changed to 0.323 part by mass, and the carbon nanofibers (D-3) was not added. The initial capacity and the capacity maintenance ratio were determined by the same method as in Example 1. The results are shown in Table 2. An example of the SEM observation images is shown in FIG. 7.

Comparative Example 5

Figure 8:
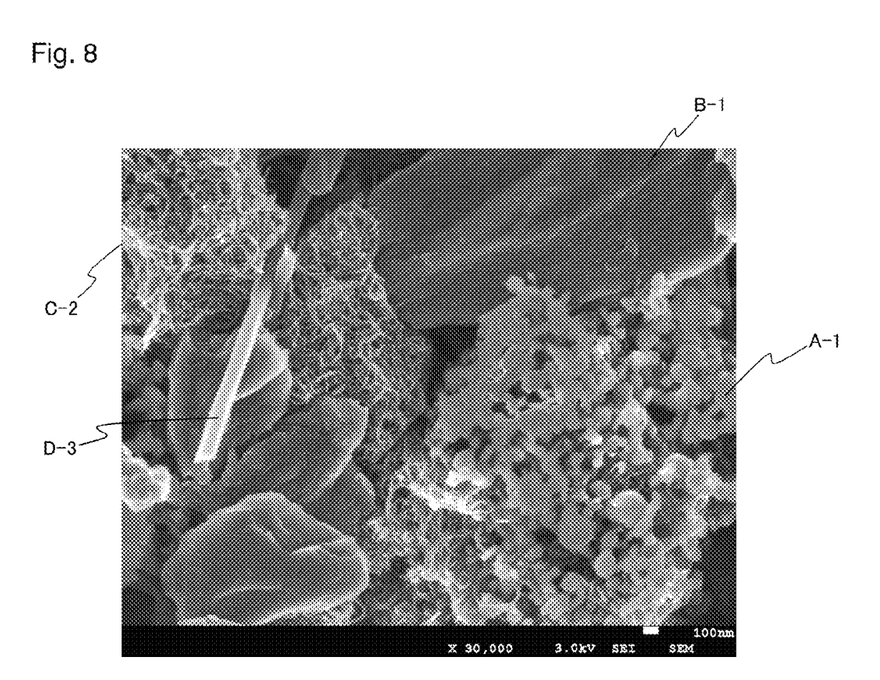
FIG. 8 shows an electron microscope image of the composite electrode material obtained in Comparative Example 5.

A CMC aqueous solution was introduced into a double planetary mixer, and then 1.0 part by mass of the particles (A-1), 9.0 parts by mass of the carbon particles (B-1), 0.0323 part by mass of the multi-walled carbon nanotubes (C-2) and 0.291 part by mass of the carbon nanofibers (D-3) were introduced. This was mixed for about 5 hours, and a water dispersion of SBR was added, and further mixed to obtain a negative electrode paste. The initial capacity and the capacity maintenance ratio were determined by the same method as in Example 1. The results are shown in Table 2. An example of the SEM observation images is shown in FIG. 8. The multi-walled carbon nanotubes (C) are entangled to form lumps. The particles (A) also form lumps. The multi-walled carbon nanotubes (C) are not cross-linked with the particles (A).

TABLE 2

|  | Example | | | Comp. Example | | | | |
|---|---|---|---|---|---|---|---|---|
|  | 1 | 2 | 3 | 1 | 2 | 3 | 4 | 5 |
| Particles(A) | | | | | | | | |
| A-1 [Part by mass] | 1 | 1 | 1 | 1 | 1 | 1 | 1 | 1 |
| Carbon particles(B) | | | | | | | | |
| B-1 [Parts by mass] | 9 | 9 | | 9 | 9 | 9 | 9 | 9 |
| B-2 [Parts by mass] | | | 9 | | | | | |
| Multi-walled carbon nanotubes(C) | | | | | | | | |
| C-2 [Part by mass] | 0.0323 | 0.0969 | 0.0323 | | | | 0.323 | 0.0323 |
| Graphitized carbon nanofibers(D) | | | | | | | | |
| D-3 [Part by mass] | 0.291 | 0.226 | 0.291 | | | 0.323 | | 0.291 |
| Electrically conductive carbon particles(E) | | | | | | | | |
| E-1 [Part by mass] | | | | | 0.667 | | | |
| Initial Capacity [mAh/g] | 605 | 601 | 600 | 510 | 603 | 555 | 638 | 545 |
| Capacity maintenance ratio [%] | 48.5 | 46.5 | 47.4 | 22.8 | 24.8 | 51.2 | 39.2 | 35.3 |

As shown by the results described above, according to the present invention, a lithium ion battery having a high initial capacity and a high capacity maintenance ratio can be obtained using a composite electrode material comprising the particles A, the carbon particles B, the multi-walled carbon nanotubes C and the carbon nanofibers D.

The invention has been described in detail with reference to the above embodiments. However, the invention should not be construed as being limited thereto. It should further be apparent to those skilled in the art that various changes in form and detail of the invention as shown and described above may be made. It is intended that such changes be included within the spirit and scope of the claims appended hereto.

What is claimed is:

1. A composite electrode material, comprising:
    particles (A) comprising an element capable of intercalating and deintercalating lithium ions,
    carbon particles (B) capable of intercalating and deintercalating lithium ions,
    multi-walled carbon nanotubes (C), and
    carbon nanofibers (D),
    wherein the carbon nanofibers (D) are bridges between two or more of the carbon particles (B),
    the multi-walled carbon nanotubes (C) are bridges between two or more of the particles (A), and
    the multi-walled carbon nanotubes (C) are present between the carbon particles (B) and the carbon nanofibers (D).

2. The composite electrode material according to claim 1, wherein the multi-walled carbon nanotubes (C) essentially have a fiber diameter of not less than 5 nm and not more than 30 nm, and the carbon nanofibers (D) essentially have a fiber diameter of not less than 50 nm and not more than 300 nm.

3. The composite electrode material according to claim 1, further comprising electrically conductive carbon particles (E).

4. The composite electrode material according to claim 1, wherein the mean fiber length of the carbon nanofibers (D) is 0.4 or more relative to the 50% particle diameter of the carbon particles (B).

5. The composite electrode material according to claim 1, wherein the aspect ratio of the multi-walled carbon nanotubes (C) in the composite electrode material is 100 or more.

6. The composite electrode material according to claim 1, wherein the amount of the particles (A) is not less than 1 part by mass and not more than 100 parts by mass relative to 100 parts by mass of the carbon particles (B).

7. The composite electrode material according to claim 1, wherein the element capable of intercalating and deintercalating lithium ions is at least one selected from the group consisting of Si, Sn, Ge, Al and In.

8. The composite electrode material according to claim 1, wherein the amount of the multi-walled carbon nanotubes (C) is not less than 0.1 part by mass and not more than 10 parts by mass relative to total 100 parts by mass of the particles (A) and the carbon particles (B), and
    the amount of the carbon nanofibers (D) is not less than 0.1 part by mass and not more than 20 parts by mass relative to total 100 parts by mass of the particles (A) and the carbon particles (B).

9. The composite electrode material according to claim 1, wherein the particles (A) have a number average primary particle diameter of not less than 5 nm and not more than 1000 nm.

10. A lithium ion secondary battery comprising the composite electrode material according to claim 1.

11. A method for producing the composite electrode material as claimed in claim 1, the method comprising:
    uniformly mixing the particles (A) comprising an element capable of intercalating and deintercalating lithium ions, the carbon particles (B) capable of intercalating and deintercalating lithium ions, the multi-walled carbon nanotubes (C), and the carbon nanofibers (D) with applying shearing stress,
    adding a water soluble resin to the uniform mixture and further mixing the mixture containing the water soluble resin with applying shearing stress.

* * * * *